US009294944B2

(12) United States Patent
Astigarraga et al.

(10) Patent No.: US 9,294,944 B2
(45) Date of Patent: Mar. 22, 2016

(54) METHOD AND APPARATUS TO MONITOR AND ANALYZE END TO END FLOW CONTROL IN AN ETHERNET/ENHANCED ETHERNET ENVIRONMENT

(71) Applicant: International Business Machines Corporation, Armonk, NY (US)

(72) Inventors: Tara Astigarraga, Rochester, NY (US); Michael E. Browne, Staatsburg, NY (US); Christopher V. DeRobertis, Hopewell Junction, NY (US); Louie Arthur Dickens, Tucson, AZ (US); Nancy J. Finn, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/723,581

(22) Filed: Dec. 21, 2012

(65) Prior Publication Data

US 2014/0177455 A1   Jun. 26, 2014

(51) Int. Cl.
*H04W 24/06* (2009.01)
*H04L 12/26* (2006.01)
*H04L 12/841* (2013.01)

(52) U.S. Cl.
CPC .......... *H04W 24/06* (2013.01); *H04L 43/0858* (2013.01); *H04L 43/0864* (2013.01); *H04L 43/106* (2013.01); *H04L 43/50* (2013.01); *H04L 47/283* (2013.01)

(58) Field of Classification Search
USPC ......................................... 370/252, 231, 229
See application file for complete search history.

(56) References Cited

U.S. PATENT DOCUMENTS

| 7,002,992 | B1 * | 2/2006 | Shaffer et al. ................. 370/468 |
| 7,031,311 | B2 * | 4/2006 | MeLampy et al. ............ 370/392 |
| 7,616,659 | B2 | 11/2009 | Benedyk et al. |
| 7,730,230 | B1 * | 6/2010 | Kondapalli ..................... 710/15 |
| 7,787,438 | B2 * | 8/2010 | Dowse .......................... 370/350 |
| 7,822,837 | B1 | 10/2010 | Urban et al. |
| 8,094,578 | B2 | 1/2012 | Nassor et al. |
| 8,159,944 | B2 | 4/2012 | Tofighbakhsh |
| 2009/0003225 | A1 | 1/2009 | Klassen et al. |

(Continued)

OTHER PUBLICATIONS

Mnisi et al, "Active Throughput Estimation Using RTT of Differing ICMP Packet Sizes", pp. 480-485, IEEE 2008.

(Continued)

*Primary Examiner* — Mohammad Anwar
(74) *Attorney, Agent, or Firm* — Steven Chiu; Michael A. Petrocelli

(57) ABSTRACT

A method and system for monitoring and analyzing flow control of packets in a communications network which includes multiple data transmission paths. The communications network has a first data path including an initiating node and a target node. A test frame is generated by an initiator module of a program executed by a computer for transmission over the first data path. The initiator module transmits the test frame over the first data path from the initiating node to the target node, wherein the test frame records a starting timestamp recorded by the initiating node upon transmitting the test frame. The test frame records a half trip timestamp recorded by the target node upon the test frame being received by the target node. The test frame records an end timestamp recorded by the initiating node, upon the test frame being received at the initiating node from the target node.

15 Claims, 4 Drawing Sheets

(56) References Cited

U.S. PATENT DOCUMENTS

2009/0296577 A1    12/2009    Gusat et al.
2010/0226384 A1*    9/2010    Prabhakar et al. ............ 370/412

OTHER PUBLICATIONS

Alizadeh et al, "Data Center Transport Mechanisms: Congestion Control Theory and IEEE Standardization", pp. 1270-1277, Sep. 23-26, 2008.

* cited by examiner

METHOD AND APPARATUS TO MONITOR AND ANALYZE END TO END FLOW CONTROL IN AN ETHERNET/ENHANCED ETHERNET ENVIRONMENT

FIELD

The present disclosure relates to a method and system for monitoring and analyzing flow control of packets or frames in a communications network, and more particularly, in one embodiment, flow control of frames in an Ethernet or Enhanced Ethernet environment.

BACKGROUND

Data communications networks include, for example, Ethernet communications technologies and standards. Ethernet communication is a family of computer networking technologies, for example, for local area networks (LANs), which defines layers and associates protocols for communications. Ethernet layer 2 includes a new 2.5 layer, and is considered a reliable transport layer. The new Ethernet 2.5 layer uses new hardware that runs new protocols for the 2.5 layer, and can route frames using the new hardware and protocols. The new layer 2.5 protocol contains all of the previous layer 2 functions, and a small subset of layer 3 functions. Previously, for example, in layer 2 of the Ethernet, layer 2 frames were not able to be routed through a router, and would thereby have to be forwarded by a switch, which limited the size and scope of a network.

However, one function that is not in the new 2.5 protocol is end to end flow control of packets or frames. End to end flow control ensures that frames are not discarded by the receiving device because the receiving device is not in a position to receive them. Therefore, in complex Ethernet/Enhanced Ethernet (Fiber Channel over Ethernet (FCoE)) environments, the monitoring of end to end flow control is performed manually by a network administrator.

One disadvantage of manual monitoring is that it is can be a tedious process which uses the time resources of the network administrator. The monitoring may include checking pause control frames by-hop, checking pause time counters and backward congestion notification for, switch to switch, or, switch to end, ports. Thus, there is no end to end flow control mechanism between an initiator and target, such as a start node and an end node, or two N ports. Due to the current lack of end to end flow control, troubleshooting and identifying problems, such as slow drain devices or real time path latency in a complex computer communication fabric is time consuming and cumbersome. For example, in large computing environments, with tens of thousands of ports (e.g., switch ports), searching and identifying problems may involve monitoring switch logs and searching port statistics to try and find likely candidates for performance impacts. Further, another problem with current end to end flow monitoring is that the administrator has to analyze the right "snap shot" of data when debugging performance declines related to pauses in certain traffic types. For example, the administrator may look at many snap shots of data to attempt by trial and error to find the right snap shot that relates to a performance decline of the network communications.

BRIEF SUMMARY

Internet control message protocols (ICMP) (for example, including IPV4 and IPV6 (internet protocol versions 4 and 6) do not provide accurate round trip times for FCoE. This is because FCoE traffic is usually assigned a priority of 3 (excellent effort), and ICMP traffic is placed in priority 7 (network traffic), which has no bandwidth limitations and the highest layer 2 priority. Therefore, a time measurement taken from ICMP would not be subject to the potential delays (pauses, etc.) that other I/O data packets (ICMP traffic) would have to endure in this environment, thus rendering the ICMP data invalid for trying to determine end to end path flow control in an Ethernet/Enhanced Ethernet (FCoE) Environment. Another problem with monitoring end to end flow using ICMP messages is that each hop that receives the packet need to understand the ICMP frame and increment or respond appropriately. Thereby, nodes that do not understand the ICMP protocols, will not be able to process the packet.

It would therefore be desirable to improve troubleshooting and enhance performance of end to end flow in complex computer environments. The present disclosure provides a solution to the above identified problems by providing, for example, a method and system for generating and monitoring round trip FCoE timestamp data that is gathered and analyzed to monitor end to end flow control in an Ethernet/Enhanced Ethernet (FCoE) Environment. In the Enhanced Ethernet and FCoE environments, the present disclosure provides a method and system for troubleshooting and performance tuning complex environments regarding end to end flow control.

According to an aspect of the invention, a method for monitoring and analyzing flow control of packets in a communications network includes: identifying multiple data transmission paths in a communications network using a computer; selecting a first data path through the communications network from the multiple data transmission paths, the first data path including an initiating node and a target node in the communications network; generating a test frame for transmission over the first data path of the communications network using an initiator module of a program executable by a processor of the computer; transmitting the test frame over the first data path from the initiating node to the target node using the initiator module; recording a starting timestamp in the test frame by the initiating node, upon transmitting the test frame; receiving the test frame at the initiating node from the target node, the test frame comprising a half trip timestamp; and recording an end timestamp in the test frame by the initiating node, upon the test frame being received at the initiating node from the target node.

In another aspect according to the invention, a system for monitoring and analyzing flow control of packets in a communications network includes a communications network including multiple data transmission paths. The system includes a first data path through the communications network from the multiple data transmission paths, the first data path including an initiating node and a target node in the communications network. The system further includes a test frame for transmission over the first data path of the communications network. The test frame is generated by an initiator module of a program. The program is embodied on a computer readable storage device in a computer having a processor for executing the program. The initiator module is configured to transmit the test frame over the first data path from the initiating node to the target node. The test frame is configured to record a starting timestamp in the test frame by the initiating node, upon transmitting the test frame. The test frame is configured to comprise a half trip timestamp when the test frame is received by the initiating node from the target node, and the test frame is configured to record an end timestamp in the test frame by the initiating node, upon the test frame being received at the initiating node from the target node.

In another aspect according to the invention, a computer program product for monitoring and analyzing flow control of packets in a communications network, includes a computer readable storage medium having program code embodied therewith, and the program code is readable/executable by a processor to perform a method, including: identifying multiple data transmission paths in a communications network; selecting a first data path through the communications network from the multiple data transmission paths, the first data path including an initiating node and a target node in the communications network; generating a test frame for transmission over the first data path of the communications network, using an initiator module of the program; transmitting the test frame over the first data path from the initiating node to the target node using the initiator module; recording a starting timestamp in the test frame by the initiating node, upon transmitting the test frame; receiving the test frame at the initiating node from the target node, the test frame comprising a half trip timestamp; and recording an end timestamp in the test frame by the initiating node, upon the test frame being received at the initiating node from the target node.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
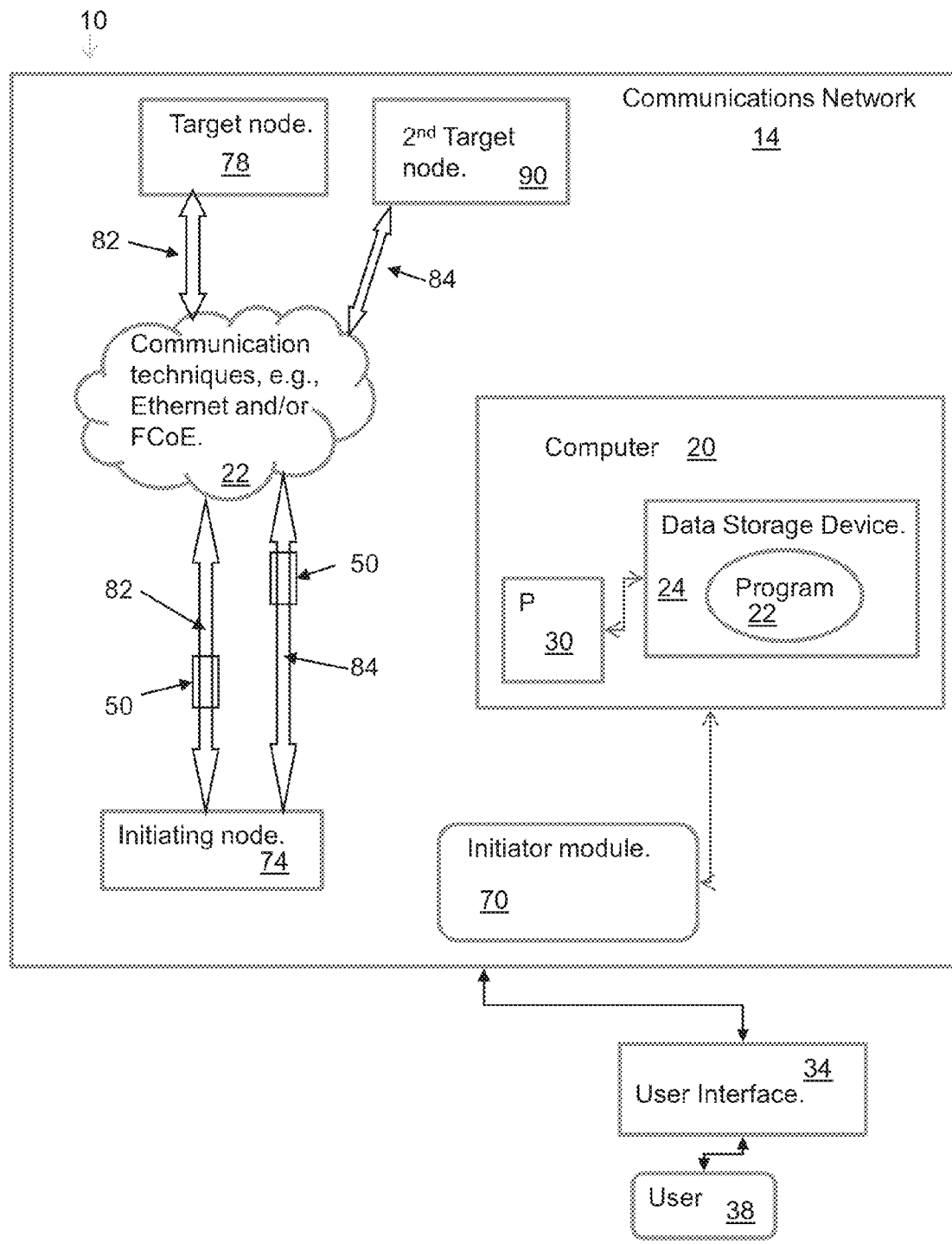
FIG. 1 is a schematic block diagram illustrating an overview of the system and methodology for monitoring end to end packet or frame flow according to an embodiment of the disclosure.
Figure 1A:
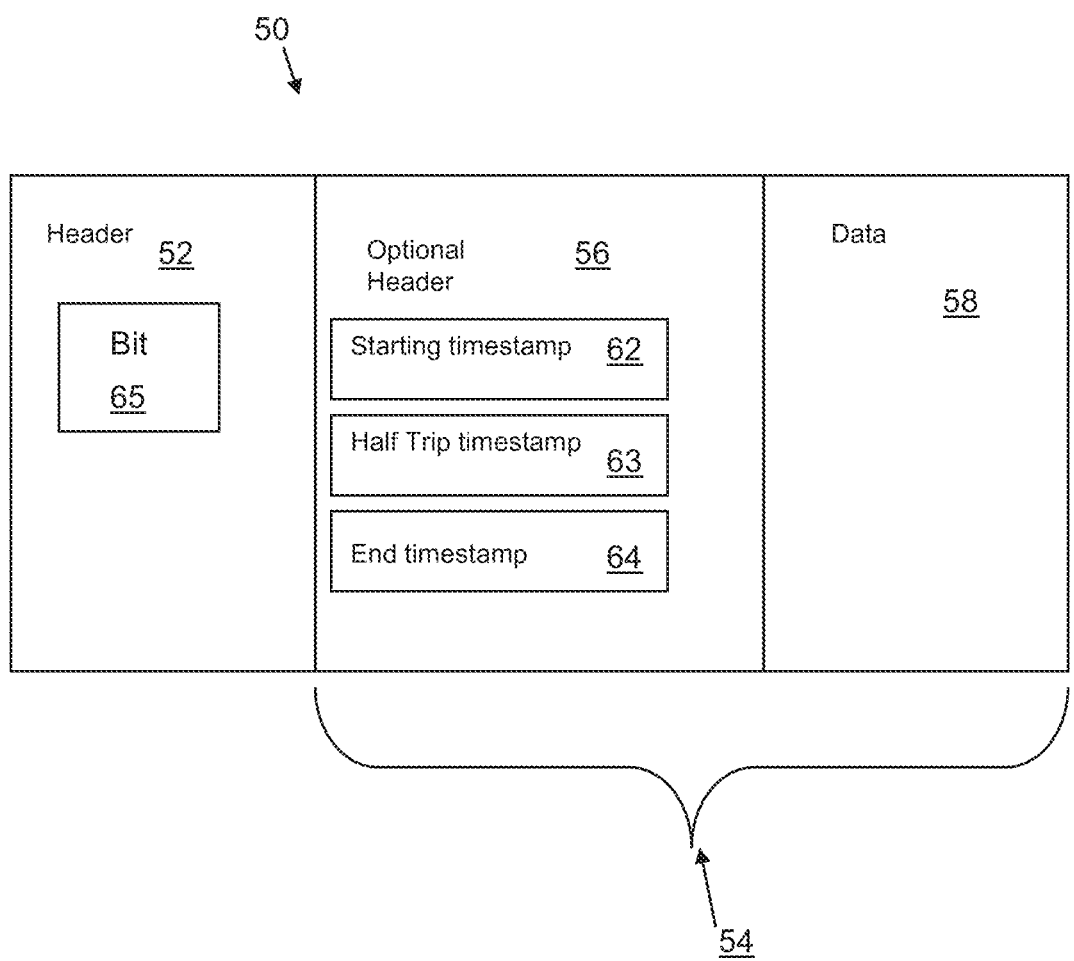
FIG. 1A is a schematic block diagram illustrating a frame according to an embodiment of the disclosure.
Figure 2:
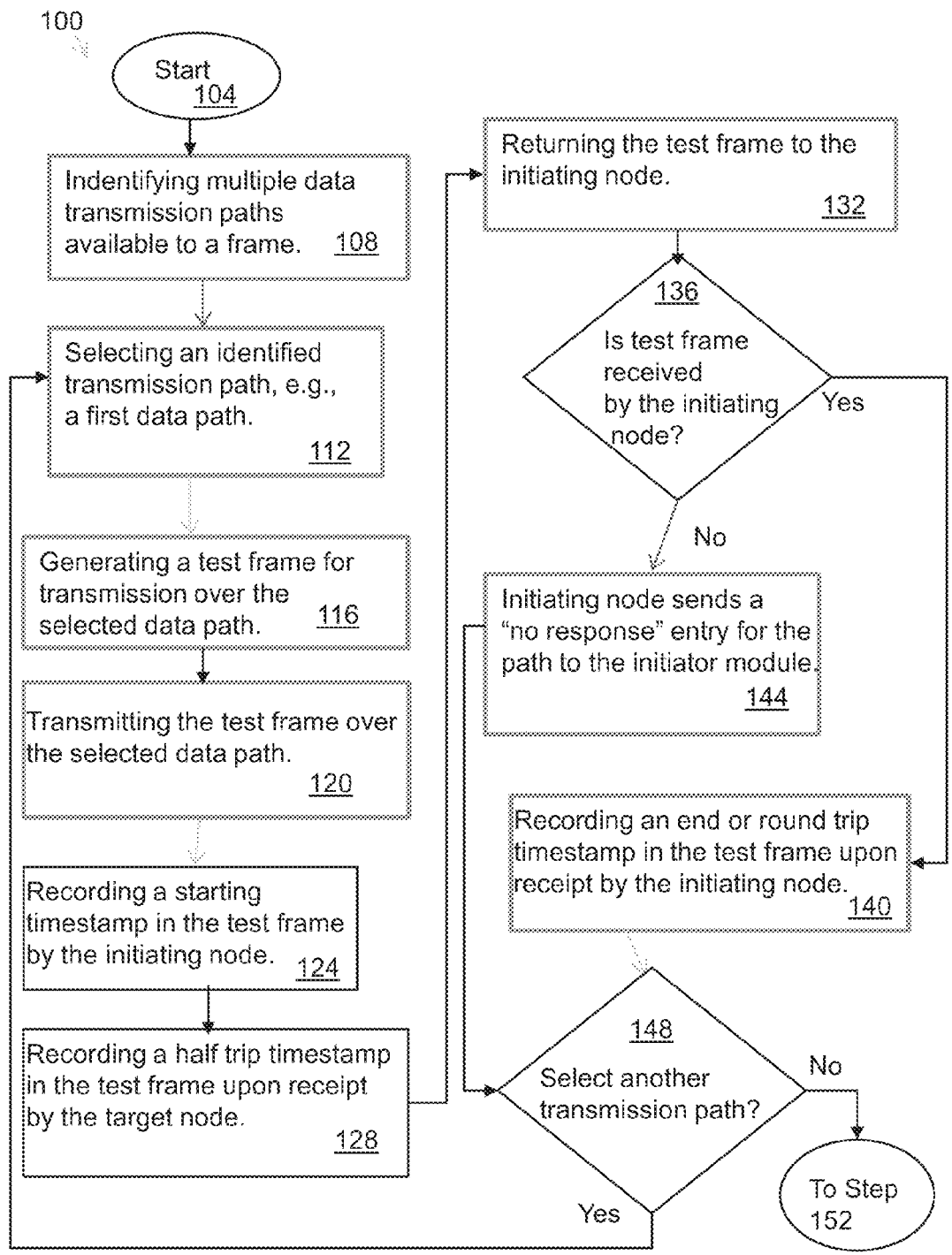
FIG. 2 is a flow chart illustrating a method for monitoring end to end packet or frame flow according to an embodiment of the disclosure.
Figure 3:
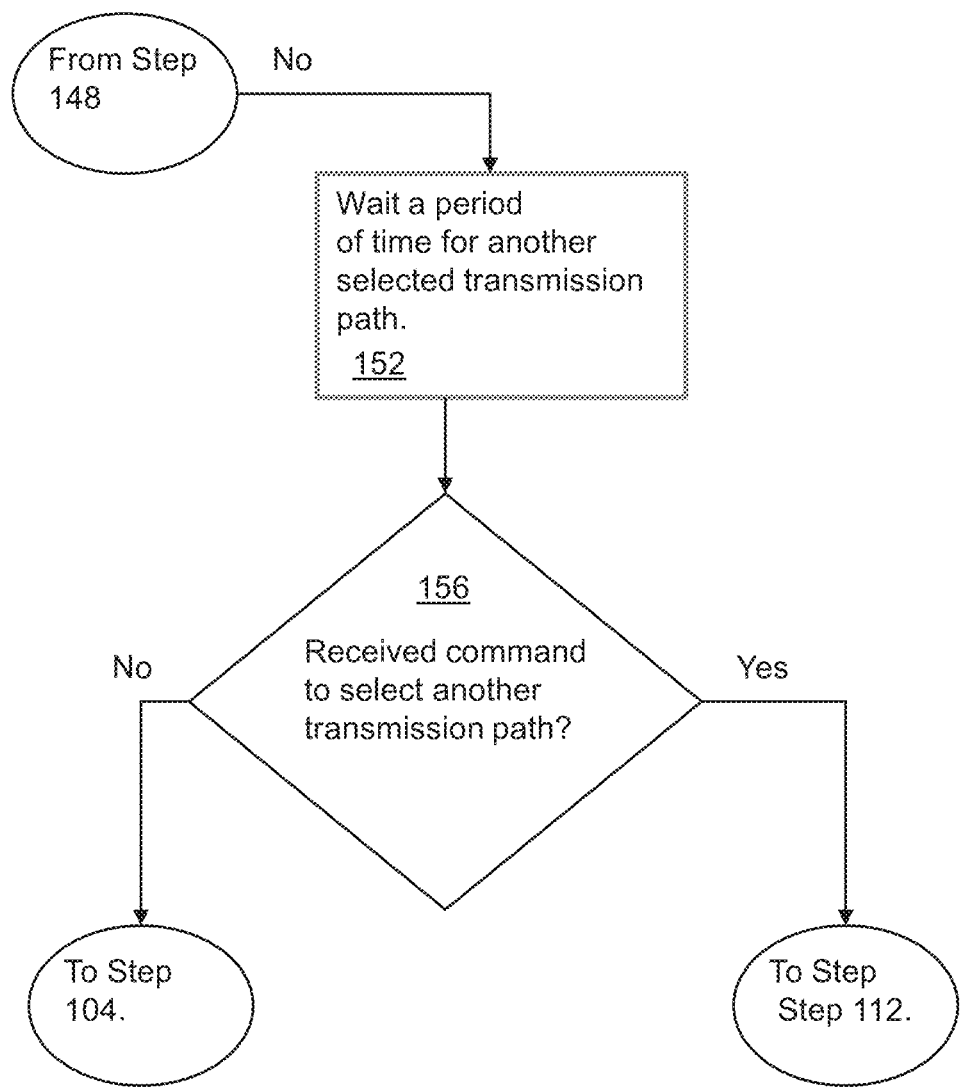
FIG. 3 is a continuation of the flow chart shown in FIG. 2.

Referring to FIGS. 1 and 2, a system 10 and method 100 according to an embodiment of the disclosure, monitors and analyzes flow control of packets or frames in a communications network 14. The system 10 includes a program 22 incorporating the steps of the method 100. The program 22 may be stored on a data storage device 24 of a computer 20, which includes a processor 30 for executing the steps of a program, i.e., the program 22. The computer 20 may include a user interface 34 allowing access capabilities to the computer 20 by a user 38. Step 104 in FIG. 2 represents the start of the method 100. Step 108 includes identifying multiple communication or transmission paths available for transmitting a specified command, frame or packet, which may be embodied as a test frame 50 in the communications network 14 as in the present disclosure. The frame 50 is shown in the data paths 82 and 84 in FIG. 1, and the frame 50 is shown in detail in FIG. 1A. In one embodiment of the invention, a driver may be used to initiate the identification of multiple communication/transmission paths.

The frame 50 is shown in the data paths 82 and 84 in FIG. 1, and the frame 50 is shown in detail in FIG. 1A. The test frame 50, as represented in FIG. 1A, for illustrative purposes, may include a header 52 (also known as a fibre channel header), and a payload 54. The payload 54 includes two sections, an optional header 56 and a data section 58. The present disclosure includes setting a bit 65 in the header 52 to indicate that a first "N" number of bytes of the payload 54 are timestamps. The bit 65 may be set in a data frame control field (not shown) of the header 52. The optional header 56 receives the timestamps as described in more detail hereinafter.

The step 108 which identifies the multiple transmission paths available for transmitting the test frame 50 may be initiated by an initiator module 70 of the program 22. Step 112 of the method 100 includes selecting a first transmission path 82 (also referred to as a first path) of the multiple communication paths. The selected path, in this embodiment, the first transmission path 82 may include a path identification (ID).

In step 116, the test frame 50 is generated and configured to be transmitted over the first transmission path 82, as selected from one of multiple identified data transmission paths. Step 120 includes sending the test frame over the first transmission path 82, from an initiating (or starting) node 74 to a target (or end) node 78 using the initiator module 70. The initiating node 74 may be a computer in communication with the computer 20, or the computer 20 itself. The target node 78 may be another computer in communication with the starting node. Additionally, for example, the initiating node 74 may be a server and the target node 78 may be a storage device, alternatively, the initiating node and the storage node may be data storage devices. Both the target node and the initiating node include communication mechanisms to communicate with one another, e.g., the same communication protocols.

Further, the initiating node 74 and the target node 78 may communicate using the selected data communication path using, for example, a defined class of service including communication protocols for the selected data path. For example, an Ethernet connection, or a fiber channel over Ethernet (FCoE), transport layer protocol Class 3 of the OSI (Open Systems Interconnection of the International Organization for Standardization (ISO)). In another example, devices may interact such that an agreed upon number of bytes of the test frame payload are used to carry round trip timestamp data. The test frame is sent using the same class of service and priority as the typical input/output load. For example, for a server/HBA (Host Bus Adapter) being utilized in the transport layer. Further, protocols for communication may also be defined in the communications network and in the data transmission path for communication between the initiating node and the target node.

In the embodiment shown in FIGS. 1 and 2, the test frame 50 travels the same transmission path as normal frames in the transmission path which are carrying data. However, the test frame of the present disclosure does not include a work command, and does not include data for processing, and thus the data section 58 (shown in FIG. 1A) is empty thereby does not require processing. Therefore, the frame 50 does not require processing time from the initiating and target nodes, such required processing could slow the nodes and the network, and thereby the network is not slowed by additional processing by the test frame.

The test frame 50 may include, or alternatively be a special command, wherein both the initiating node and the target node (that is, the target) understand the special command/test frame. For example, differing network adapters and/or computer storage devices interact with agreed upon protocols, and may also set a first number of bytes of the test frame payload would be used to carry round trip timestamp data (e.g., analogous to a stop watch clocking end to end time). The test frame may be sent using the same class of service and priority as a typical I/O load for a server being utilized.

Step 120 of the method 100 includes routing the test frame through the selected transmission path through the communications network, that is, along a first data path (also may be referred to as a first data transmission path) which was selected at step 112. The command is routed through the first data path of the communications network according to conventional techniques, for example, using source/destination information along its path.

Upon transmission of the test frame 50 by the initiating node, the initiating node records a starting timestamp in the test frame, as in step 124 of the method 100. The test frame is received by the target node and processed by the target node including, as in Step 128, recording a half trip timestamp in the test frame upon receipt of the test frame by the target node 78. The test frame is returned to the initiating node 74 by the target node 78.

Step 136 includes ascertaining if the test frame is received by the initiating node 74. If the test frame is received by the initiating node the method 100 goes to step 140 and records an end timestamp in the test frame upon receipt by the initiating node 74.

If the test frame 50 is received by the initiating node 74, the method 100 moves to step 140 which includes the initiating node 74 recording an end or round trip timestamp in the test frame upon receipt of the test frame 50 by the initiating node 74. The initiator module 70 communicating with the initiating node 74, inquires of the initiating node 74, for the test frame time stamps, that is, the starting timestamp, the half trip timestamp, and the end or round trip timestamp. Therein, the method provides segmented periods of time of the test frame from the initiating node 74 to the target node 78 represented by the half trip timestamp, and a round trip time for the entire test frame trip beginning from the initiating node 74, and returning to the initiating node 74 from the target node 78. Thus, a half trip time is determined by the difference between the starting timestamp and the half trip timestamp, and a round trip time is determined by the difference between the starting timestamp and the end or round trip timestamp at the test frame's return to the initiating node 74 from the target node 78. For example, if a starting timestamp is 00, and the end or round trip timestamp is 5 microseconds, then the entire roundtrip took 5 microseconds.

If the test frame is not received by the initiating node, the method 100 goes to step 144 wherein the initiating node 74 sends a "no response" entry for the path to the initiator module 70. For example, after a determined amount of time, the test frame may be considered dropped/lost, and the initiating node 74 sends the "no response" entry, or for example, a "no response/potential dropped frame" entry, and forwards the test frame and entry information to the initiator module 70 or a central processing location including an assigned path ID (identification).

In a multiple node communications path, the nodes may be defined as an initiating node, and first node, a second node, etc. Each leg or segment of the path may be defined as from the initiating node to the first node, from the first node to the second node, etc.

In Step 148, the method 100 inquires as to whether another transmission path is selected from the identified multiple data transmissions paths of step 108, for example, a $2^{nd}$, $3^{rd}$, or $4^{th}$ path. For example, in FIG. 1, a second data transmission path 84 is identified having a second target node 90. If another data path is selected for routing a test frame, the method 100 proceeds to step 112. If no additional data paths are selected at step 148, the method 100 proceeds to step 152 to wait for a selected period of time for a command or instructions. At step 156, the method determines if a command is received to select another transmission path, the method goes to step 112 if a command is received, and if no command is received, the method returns to start at step 104.

In one embodiment of the disclosure, the timestamps, that is, the starting, half trip, and end timestamps, 62, 63, 64, respectively, may carry two—four-byte timestamp fields in the optional header 56. Thus, the starting timestamp 62 contains the timestamp from the initiating node 74 indicating when the initiating node sent the frame 50. Likewise, the half trip timestamp 63 contains the timestamp from the target node 78 indicating when the target node sent the frame 50 back to the initiating node. In one example, the target node 78 can copy the initiating node's starting timestamp to a new frame, and add the half trip timestamp. All the timestamps, and the bit, as well as a section in the frame for data 58 is represented by the frame 50 in FIG. 1A.

Alternatively, a second test frame may be initiated along a second communications path, for example path 84, from another starting node (not shown) to another end or target node.

Thereby, in the embodiments of the disclosure described above, the target node 78 receives the test frame (alternatively, for example, a command), processes the test frame, and returns status of the test frame, e.g., a half trip timestamp encoded or embodied in the test frame, to the initiating node 74.

In another embodiment of the disclosure, a receiving timestamp at the target node (which is the half trip timestamp) is recorded when the test frame is received at the target node. The test frame is provided with a return timestamp from the target node, when the test frame is sent from the target node back to the initiating node. The difference between the received timestamp (or half trip timestamp) and the return timestamp is a latency time at the target node. The same technique can be applied to multiple target nodes in a communication path with multiple legs or segments between multiple nodes. Thereby, the latency time at the target node is determined by the difference in time between the arrival time at the target node designated by the receiving timestamp at the target node 78, and the return timestamp at the target node. Thus, the timestamp data in the test frame may reflect not only the round trip timestamp, but also the latency of each leg of the journey, that is, at a node (the target node 78 in the above example).

In an alternative embodiment according the disclosure, every frame transported over a designated data communications network can be time stamped. The time stamping can be accomplished in a similar manner as described above for the test frame. However, in this embodiment, the frames carry data in the data section 58 of the frame as the frames constitute typical traffic in the network. Additionally, both the initiating node and the target node support enhancement to the frame, in other words, the nodes agree on the frame enhancement, that is, the time stamping of the frame. Once the nodes are in agreement, every frame originated by both the initiating and the target node would contain timestamps, allowing continuous monitoring of the network.

In one instance in accordance with the present disclosure, a central processing location, embodied as the initiator module 70 in the embodiment of FIG. 1, can also be a processor located within a server or other entity (not shown) with processing capabilities. A central processing location could also reside in software, or one or more pieces of software which helps to monitor communication fabric statistics. The initiator module 70 (or an alternative processor located in a central processing location) can gather and correlate transmission path data and track historical norms for each path. The data could be used to monitor average round trip path latency and could also be used to define and monitor thresholds per path. Thresholds may include administrator defined variables, or could be mathematical percents of a defined norm. For example, a threshold may be defined at 25% above the average path latency. If the path threshold is exceeded, a variety of actions could be possible including sending notification messages to a system administrator or notifying a device multipath driver, or adding message logs of higher than average latencies. Exceeding a threshold may also indicate other issues including, slow drain devices, priority flow control pauses, or high traffic areas/times. The ability to identify traffic paths which exceeds thresholds provides valuable information to network administrators, and allows them to take proactive measures to stabilize their computing environment before symptoms spread across the computing environment, or begin to result in power outages.

The method and system of the present disclosure may be implemented on different communication systems, for example, a mixed Ethernet/Converged Enhanced Ethernet (CEE), and a fiber channel over Ethernet/Fiber Channel (FCoE/FC). In another example, a transition phase of a test frame may include using a Converged Network Adapter (CNA) (which may include multiple hops), and a Storage Area Network (SAN) switch (which also may include multiple hops), and a CNA or Host Bus Adapter (HBA). Additionally, an embodiment having different communications systems may include a new Ethernet type standard (for example, created via a standards body) and implemented as an industry standard.

Thereby, in the one or more embodiments of the disclosure discussed above, a method and system is provided to track and correlate end to end path flow control in an Ethernet/Enhanced Ethernet (FCoE) Environment. The method and system provides end to end flow control snap shots and also the ability to correlate data across time periods to check for data communication paths that have higher than average round trip times, potentially causing slow drains on the larger fabric of the communication network. One advantage of the present disclosure is that data paths in a complex environment that are experiencing high pause times, reliability issues, or higher than average latencies for certain traffic types, can be identified and correlated to the individual or groups of CNAs (targets and/or initiators) that they are impacting. Further, path thresholds can be set based on administrator identified thresholds or trends seen in a computing environment, and appropriate actions taken if the thresholds are exceeded. Thereby, round trip FCoE timestamp data that is gathered and analyzed to monitor end to end flow control in an Ethernet/Enhanced Ethernet (FCoE) Environment is provided by the above system and method 100.

The present disclosure includes the initiating node and the target node participants for processing the test frame, however, other nodes in the data communications path (that is, hops to other nodes in the communication path between the initiating node and the target node) simply pass the test frame with no further actions required by the other nodes. The test frame is sent via the same class of service/priority (for example, (virtual local area network) VLAN, Priority 3 default for FCoE) as other data frames (for example, read/write data) which provides realistic time stamps for latency calculations on a given data transmission path.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multi-processor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for monitoring and analyzing flow control of packets in a communications network, comprising:

identifying multiple data transmission paths in a communications network using a computer;

selecting a first data path through the communications network from the multiple data transmission paths, the first data path including an initiating node and a target node using agreed upon protocols in the communications network, wherein the initiating node and the target node communicate using the first data path and a selected class of service including multiple communication protocols for the first data path, the selected class of service being fiber channel over Ethernet (FCoE), using transport layer protocol Class 3 of the OSI (Open System Interconnection of the International Organization for Standardization (ISO));

generating a test frame for transmission over the first data path of the communications network using an initiator module of a program executable by a processor of the computer, the test frame includes a header and a payload, the payload having a data section, generating the test frame using the initiator module of the program, the first data path including multiple hops, and the test frame being configured to negotiate the multiple protocols along the first data path;

transmitting the test frame over the first data path from the initiating node to the target node using the initiator module;

recording a starting timestamp in the test frame by the initiating node, upon transmitting the test frame;

recording a return timestamp in the test frame at the target node upon the test frame being returned to the initiating node from the target node;

generating a latency time at the target node by calculating a difference between the half trip timestamp and the return timestamp;

receiving the test frame at the initiating node from the target node, the test frame comprising a half trip timestamp recorded therein;

recording the half trip timestamp in the test frame by the target node, upon the test frame being received by the target node;

returning the test frame to the initiating node by the target node;

recording an end timestamp in the test frame by the initiating node, upon the test frame being received at the initiating node from the target node; and wherein the initiating node is a server and the target node is a storage device, or wherein the initiating node and the storage node are storage devices, and no additional data for processing at the target node is included in the data section of the payload, the data section being empty of data receiving processing at the target node.

2. The method of claim 1, further comprising:
sending a second test frame along a second communications path from the initiating node to the target node.

3. The method of claim 1, further comprising:
sending another frame along a second communications path from a second initiating node to a second target node in the communications network.

4. The method of claim 1, wherein only the half trip timestamp is recorded in the test frame at the target node.

5. The method of claim 1, further comprising:
setting a bit in the header to indicate an amount of bytes of the payload allocated for timestamps being received in an optional header section of the payload.

6. The method of claim 1, wherein the multiple protocols along the first data path are not Internet control message protocols (ICMP) versions IPV4 or IPV6 (Internet protocol versions 4 and 6).

7. A system for monitoring and analyzing flow control of packets in a communications network, comprising:
a communications network including multiple data transmission paths;

a first data path through the communications network from the multiple data transmission paths, the first data path including an initiating node and a target node using agreed upon protocols in the communications network, wherein the initiating node and the target node communicate using the first data path and a selected class of service including multiple communication protocols for the first data path, the selected class of service being fiber channel over Ethernet (FCoE), using transport layer protocol Class 3 of the OSI (Open System Interconnection of the International Organization for Standardization (ISO));

a test frame for transmission over the first data path of the communications network, the test frame being generated by an initiator module of a program, the test frame includes a header and a payload, the payload having a data section, generating the test frame using the initiator module of the program, the first data path including multiple hops, and the test frame being configured to negotiate the multiple protocols along the first data path;

the program being embodied on a computer readable storage device in a computer having a processor for executing the program, the initiator module being configured to transmit the test frame over the first data path from the initiating node to the target node, the test frame being configured to record a starting timestamp in the test frame by the initiating node, upon transmitting the test frame, the test frame being configured to comprise a half trip timestamp recorded therein when the test frame is received by the initiating node from the target node, and the test frame being configured to record an end timestamp in the test frame by the initiating node, upon the test frame being received at the initiating node from the target node, recording a return timestamp in the test frame at the target node upon the test frame being returned to the initiating node from the target node, and generating a latency time at the target node by calculating a difference between the half trip timestamp and the return timestamp, recording the half trip timestamp in the test frame by the target node, upon the test frame being received by the target node, and returning the test frame to the initiating node by the target node; and wherein the initiating node is a server and the target node is a storage device, or wherein the initiating node and the storage node are storage devices, and no additional data for processing at the target node is included in the data section of the payload, the data section being empty of data receiving processing at the target node.

8. The system of claim 7, further comprising:
a second test frame for sending along a second communications path from the initiating node to the target node.

9. The system of claim 7, further comprising:
sending another frame along a second communications path from a second starting node to a second end node in the communications network.

10. The system of claim 7, wherein the test frame is configured to negotiate multiple protocols along the first data path.

11. The system of claim 7, wherein the first data path includes multiple hops, and the test frame is configured to negotiate multiple protocols along the first data path.

12. The system of claim 7, wherein only the half trip timestamp is recorded in the test frame at the target node.

13. The system of claim 7, wherein a bit is set in the header to indicate an amount of bytes of the payload allocated for timestamps being received in an optional header section of the payload.

14. A computer program product for monitoring and analyzing flow control of packets in a communications network, the computer program product comprising a computer readable non-transitory storage medium having program code embodied therewith, the program code being readable/executable by a processor to perform a method, comprising:
identifying multiple data transmission paths in a communications network;

selecting a first data path through the communications network from the multiple data transmission paths, the first data path including an initiating node and a target node using agreed upon protocols in the communications network, wherein the initiating node and the target node communicate using the first data path and a selected class of service including multiple communication protocols for the first data path, the selected class of service being fiber channel over Ethernet (FCoE), using transport layer protocol Class 3 of the OSI (Open System Interconnection of the International Organization for Standardization (ISO));

generating a test frame for transmission over the first data path of the communications network, using an initiator module of the program, the test frame includes a header and a payload, the payload having a data section, generating the test frame using the initiator module of the program, the first data path including multiple hops, and the test frame being configured to negotiate the multiple protocols along the first data path;

transmitting the test frame over the first data path from the initiating node to the target node using the initiator module;

recording a starting timestamp in the test frame by the initiating node, upon transmitting the test frame;

recording a return timestamp in the test frame at the target node upon the test frame being returned to the initiating node from the target node;

generating a latency time at the target node by calculating a difference between the half trip timestamp and the return timestamp;

receiving the test frame at the initiating node from the target node, the test frame comprising a half trip timestamp recorded therein;

recording the half trip timestamp in the test frame by the target node, upon the test frame being received by the target node;

returning the test frame to the initiating node by the target node;

recording an end timestamp in the test frame by the initiating node, upon the test frame being received at the initiating node from the target node; and wherein the initiating node is a server and the target node is a storage device, or wherein the initiating node and the storage node are storage devices, and no additional data for processing at the target node is included in the data section of the payload, the data section being empty of data receiving processing at the target node.

15. The computer program product of claim 14, further comprising:

setting a bit in the header to indicate an amount of bytes of the payload allocated for timestamps being received in an optional header section of the payload.

* * * * *